(12) United States Patent
Kurien et al.

(10) Patent No.: US 7,797,311 B2
(45) Date of Patent: Sep. 14, 2010

(54) ORGANIZING SCENARIO-RELATED INFORMATION AND CONTROLLING ACCESS THERETO

(75) Inventors: Thekkthalackal Varugis Kurien, Sammamish, WA (US); Steven E. Jackson, Issaquah, WA (US); Scott A. Field, Redmond, WA (US); David B. Cross, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 11/688,062

(22) Filed: Mar. 19, 2007

(65) Prior Publication Data
US 2008/0235229 A1 Sep. 25, 2008

(51) Int. Cl.
*G06F 7/00* (2006.01)
*G06F 17/30* (2006.01)
(52) U.S. Cl. .................. 707/722; 707/758; 707/781
(58) Field of Classification Search .............. 707/3, 707/999.101–105, 999.01, 999.1, 722, 758, 707/781, 999.001–5
See application file for complete search history.

(56) References Cited

U.S. PATENT DOCUMENTS

| 5,148,365 | A | 9/1992 | Dembo |
| 5,546,507 | A | 8/1996 | Staub |
| 5,664,093 | A | 9/1997 | Barnett et al. |
| 5,790,780 | A | 8/1998 | Britcha et al. |
| 6,098,065 | A | 8/2000 | Skillen et al. |
| 6,212,545 | B1 | 4/2001 | Ohanti et al. |
| 6,240,399 | B1 | 5/2001 | Frank et al. |
| 6,658,598 | B1 | 12/2003 | Sullivan |
| 6,767,215 | B2 | 7/2004 | Robertson |
| 6,810,401 | B1 | 10/2004 | Thompson et al. |
| 6,832,218 | B1 | 12/2004 | Emens et al. |
| 6,907,416 | B2 | 6/2005 | Tasooji et al. |
| 6,947,917 | B1 | 9/2005 | Mathur et al. |
| 7,076,443 | B1 | 7/2006 | Emens et al. |

(Continued)

FOREIGN PATENT DOCUMENTS

EP 0837403 A 4/1998

(Continued)

OTHER PUBLICATIONS

International Search Report with Written Opinion dated Jun. 23, 2008.

(Continued)

*Primary Examiner*—Mohammad Ali
*Assistant Examiner*—Kannan Shanmugasundaram
(74) *Attorney, Agent, or Firm*—Shook Hardy & Bacon L.L.P., Intellectual Property Department (57) ABSTRACT

Mechanisms for organizing scenario solution-related information based upon a user's locality are provided. Locality refers to a collection of metadata created based upon scenario solutions executed by a user and/or enablers acquired by a user during scenario solution execution. Such metadata may be stored in association with a scenario solution execution workspace and/or in association with a user-specific information store. Once such information is acquired, a user may desire to share the information, or a portion thereof, with one or more other users, for instance, the members of a user group. However, often times, the user would prefer that the information not be made available to the general public. Thus, mechanisms for controlling access to user-specific information are also provided.

9 Claims, 6 Drawing Sheets

U.S. PATENT DOCUMENTS

| | | |
|---|---|---|
| 7,089,235 B2 | 8/2006 | Dettinger et al. |
| 7,505,921 B1 | 3/2009 | Lukas |
| 7,505,984 B1 | 3/2009 | Nevil-Manning et al. |
| 2002/0052894 A1* | 5/2002 | Bourdoncle et al. ......... 707/513 |
| 2002/0184165 A1 | 12/2002 | Deboer et al. |
| 2003/0008270 A1 | 1/2003 | Fleishman |
| 2003/0101104 A1 | 5/2003 | Dimitrova et al. |
| 2004/0006550 A1 | 1/2004 | Upton |
| 2004/0095376 A1 | 5/2004 | Graham et al. |
| 2004/0153428 A1 | 8/2004 | Reid et al. |
| 2004/0230572 A1 | 11/2004 | Omoigui |
| 2004/0255243 A1 | 12/2004 | Vincent |
| 2005/0071251 A1 | 3/2005 | Linde et al. |
| 2005/0080775 A1 | 4/2005 | Colledge et al. |
| 2005/0091207 A1 | 4/2005 | Shimizu et al. |
| 2005/0197829 A1 | 9/2005 | Okumura |
| 2005/0220351 A1 | 10/2005 | Vanderwende et al. |
| 2005/0289168 A1 | 12/2005 | Green et al. |
| 2006/0064404 A1 | 3/2006 | Kishore et al. |
| 2006/0190439 A1* | 8/2006 | Chowdhury et al. ............ 707/3 |
| 2006/0200371 A1* | 9/2006 | Spector et al. .................. 705/7 |
| 2006/0218035 A1 | 9/2006 | Park et al. |
| 2006/0242017 A1 | 10/2006 | Libes et al. |
| 2006/0287919 A1 | 12/2006 | Rubens et al. |
| 2007/0027894 A1 | 2/2007 | Bridges et al. |
| 2007/0027919 A1 | 2/2007 | Mastel |
| 2008/0027804 A1 | 1/2008 | Kaplan |
| 2008/0109285 A1 | 5/2008 | Reuther et al. |
| 2008/0177726 A1 | 7/2008 | Forbes et al. |

FOREIGN PATENT DOCUMENTS

| | | |
|---|---|---|
| JP | 10124529 A | 5/1998 |
| JP | 2003085353 A | 3/2003 |
| JP | 2007013409 A | 1/2007 |
| KR | 1020010098004 A | 11/2001 |
| KR | 1020013398004 A | 11/2001 |
| KR | 1020030057005 A | 7/2003 |
| KR | 1020060050484 A | 5/2006 |
| KR | 1020060043381 A | 6/2006 |
| WO | 03046761 A | 6/2003 |
| WO | 2006009410 A1 | 1/2006 |

OTHER PUBLICATIONS

US Patent Office Action, U.S. Appl. No. 11/688,023, mailed Jul. 28, 2009, 18 pages.
US Patent Office Action, U.S. Appl. No. 11/688,023, mailed Feb. 27, 2009, 13 pages.
US Patent Office Action, U.S. Appl. No. 11/688,002, mailed Apr. 27, 2009, 27 pages.
US Patent Office Action, U.S. Appl. No. 11/688,037, mailed Jun. 1, 2009, 17 pages.
International Search Report with Written Opinion, Date of mailing: Aug. 11, 2008—U.S. Appl. No. 11/688,002—12 pp.
International Search Report with Written Opinion, Date of mailing: Jul. 28, 2008—U.S. Appl. No. 11/688,037 (PCT/US2008/054990)—14 pp.
Final Office Action, U.S. Appl. No. 11/688,002, mailed Jan. 11, 2010—29 pp.
Final Office Action—U.S. Appl. No. 11/688,037, mailed Jan. 27, 2010—24 pp.
Office Action mailed May 21, 2010 re U.S. Appl. No. 11/688,037—13 pp.
Final Office Action mailed Apr. 23, 2010 re U.S. Appl. No. 11/688,023—15 pp.

* cited by examiner

- Prior Art -

ORGANIZING SCENARIO-RELATED INFORMATION AND CONTROLLING ACCESS THERETO

BACKGROUND

Use of online searching as a means to locate desired information has significantly increased in recent years to become one of the most prevalent systems for locating information in use today. Generally, search engines utilize keyword matching to locate information containing identical and/or similar keywords to a search query input by a user. While keyword matching has its advantages over more generic search methods, a significant number of items are often returned in response to a search query, many of which are not related to the core topic intended by the user.

Advancements in keyword search have more recently been directed toward mining search-related data in an attempt to enhance a user's search experience. For instance, suppose a user initiates a search containing the keywords "photographs and editing." In response thereto, a plurality of items is returned to the user, each containing and/or relating to the input keyword. A more advanced search engine may also return information based on search-related data mining such as, "Users who searched 'photographs and editing' also searched the keyword 'cropping'", or "The most popular selections by users who searched the keywords 'photographs and editing' are . . . ", and the like. While such suggestions provide the user with an enhanced user experience relative to a search engine that returns basic keyword results and nothing further, the user experience may still suffer from a lack of relevance.

For example, suppose the user initiating the above search isn't interested in consumer photograph editing but rather in editing using commercial photography equipment. Being presented with a list of keywords or sites utilized by others who also searched the keywords "photographs and editing" will likely more often return selections relevant to consumer photograph editing as it is more likely that a greater number of users are interested in editing photographs on their personal computer than in editing using commercial photography equipment. Accordingly, the data mining information returned in this instance is still not related to the core topic of interest to the user.

Additionally, information returned as a result of the above search, while presenting information relevant to the user's interest as evidenced by the search query content, may not actually be relevant to the user. That is, suppose that the user is a Macintosh user and desires to edit photographs. Search results returned in response to the keywords "photographs and editing," even if related to consumer photograph editing instead of editing using commercial photography equipment, are unlikely to be related to editing photographs using a Macintosh computer or, to the extent a search result is relevant to Macintosh consumer photograph editing, all results have to be perused by the user to identify the particular relevant result.

BRIEF SUMMARY

Embodiments of the present invention relate to organizing scenario solution-related information based upon a user's locality. "Locality," as the term is utilized herein, refers to a collection of metadata created based upon scenario solutions executed by a user and/or enablers acquired by a user during scenario solution execution. Such metadata may be stored in association with a scenario solution execution workspace (that is, a real or virtual execution environment within which enablers provided by a scenario solution execute), and/or in association with a user-specific information store. Once such information is acquired, a user may desire to share the information, or a portion thereof, with one or more other users, for instance, the members of a user group. However, often times, the user would prefer that the information not be made available to the public at-large. Thus, embodiments of the present invention further relate to controlling access to user-specific information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods, systems and computer-readable media for organizing scenario solution-related information based upon a user's locality. "Locality," as the term is utilized herein, refers to a collection of metadata created based upon scenario solutions executed by a user and/or enablers acquired by a user during scenario solution execution. Such metadata may be stored in association with a scenario solution execution workspace (that is, a real or virtual execution environment within which enablers provided by a scenario solution execute), and/or in association with a user-specific information store. Once such information is acquired, a user may desire to share the information, or a portion thereof, with one or more other users, for instance, the members of a user group. However, often times, the user would prefer that the information not be made available to the public at-large. Thus, embodiments of the present invention further relate to controlling access to user-specific information.

Accordingly, in one aspect, the present invention provides one or more computer-readable media having computer-executable instructions embodied thereon that, when executed, perform a method for organizing scenario solution-related information. The method includes receiving a plurality of executable scenario solutions and associating each received executable scenario solution with at least one namespace and/or keyword space. In embodiments the method may further include receiving a scenario-related query, determining if the at least one namespace/keyword space is relevant to the scenario-related query, and if it is determined that the at least one namespace/keyword space is relevant to the scenario-related query, analyzing metadata associated with the namespace/keyword space to identify at least one executable scenario solution associated therewith that is relevant to the scenario-related query, wherein metadata associated with namespaces/keyword spaces other than the at least one namespace/keyword space is not analyzed.

In another aspect, the present invention provides a computerized system for organizing scenario solution-related information. The system includes a scenario solution authoring engine configured for receiving a plurality of scenario solution entities and associating the scenario solution entities to create executable scenario solutions, an end-user device configured for receiving one or more scenario-related queries, and a server configured for receiving the one or more scenario-related queries from the end-user device and the executable scenario solutions from the scenario solution authoring engine. The server is further configured for organizing the received scenario-related queries and the executable scenario solutions and for controlling access thereto. The scenario solution authoring engine, the end-user device and the server are in communication with one another via a network.

In a further aspect, the present invention provides a method for organizing scenario solution-related information. The method includes receiving an executable scenario solution, associating the executable scenario solution with at least one namespace and/or keyword space, receiving a scenario-related query, determining if the received scenario-related query is relevant to the at least one namespace/keyword space, and if it is determined that the received scenario-related query is relevant to the at least one namespace/keyword space, transmitting the executable scenario solution for presentation. In embodiments the method may further include creating a local instance of the namespace/keyword space in association with at least one workspace and controlling access to information stored in association with the namespace/keyword space and/or the workspace.

Having briefly described an overview of embodiments of the present invention, an exemplary operating environment suitable for implementing embodiments of the present invention is described below.

Figure 1:
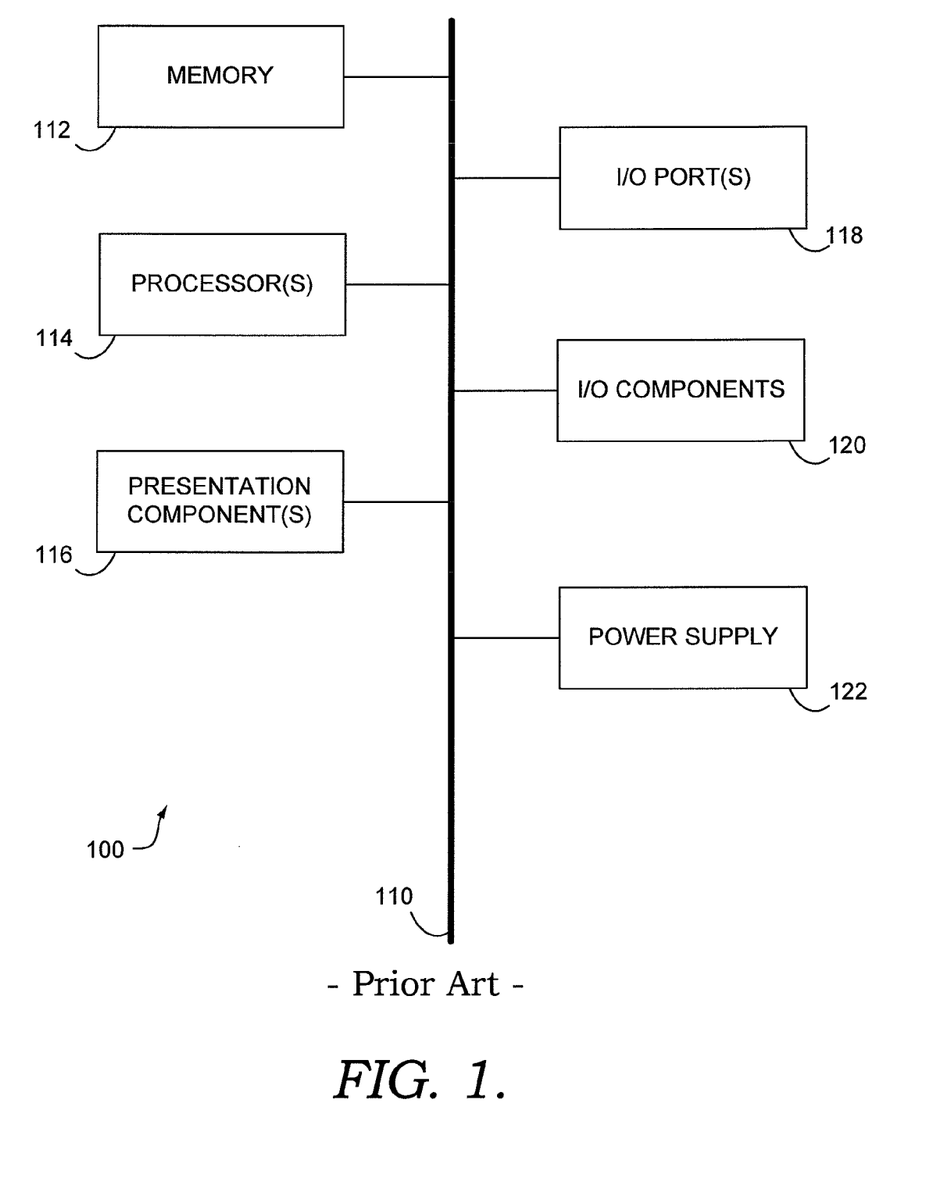
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
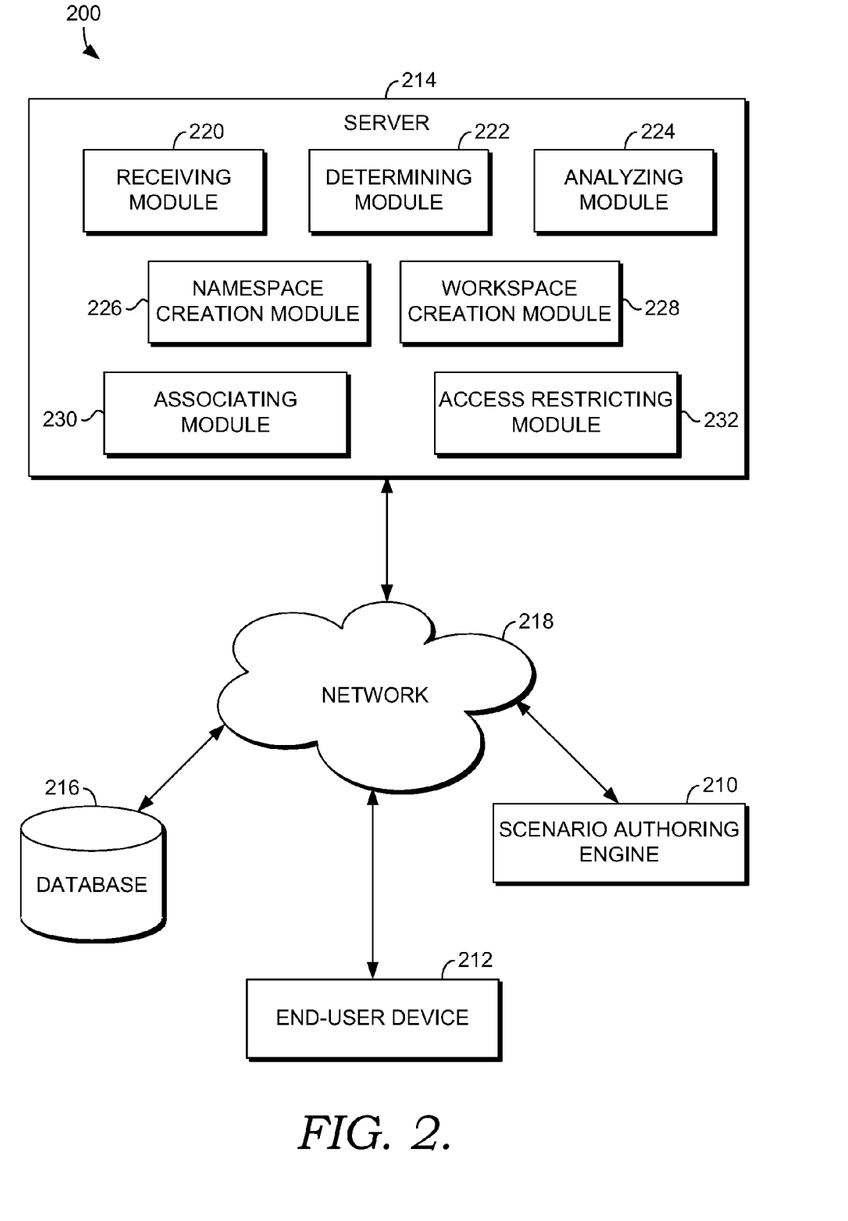
FIG. 2 is a block diagram of an exemplary computing system architecture suitable for use in implementing embodiments of the present invention.

As previously mentioned, embodiments of the present invention relate to organizing scenario solution-related information and controlling access thereto. Turning now to FIG. 2, a block diagram is illustrated that shows an exemplary computing system architecture 200 configured for organizing scenario solution-related information and controlling access to such information (that is, restricting or allowing access by security principals such as users, machines, and/or applications), in accordance with embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement relating to any single component/module or combination of components/modules illustrated therein.

Computing system architecture 200 includes a scenario solution authoring engine 210, an end-user device 212, a server 214, and a database 216, all in communication with one another via a network 218. The network 218 may include, without limitation, one or more local area networks (LANs) and/or wide area networks (WANs). Such networking environments are commonplace in offices, enterprise-wide computer networks, internets, and the Internet. Accordingly, the network 218 is not further described herein.

The database 216 is configured to store information associated with at least one scenario solution. In various embodiments, such information may include, without limitation, one or more scenario solutions, one or more scenario descriptions, one or more scenario-related queries, metadata related to access control, and the like. In embodiments, the database 216 is configured to be searchable for one or more of the items stored in association therewith. It will be understood and appreciated by those of ordinary skill in the art that the information stored in the database 216 may be configurable and may include any information relevant to an executable scenario solution. The content and volume of such information are not intended to limit the scope of embodiments of the present invention in any way. Further, though illustrated as a single, independent component, database 216 may, in fact, be a plurality of databases, for instance, a database cluster, portions of which may reside on a computing device associated with the scenario solution authoring engine 210, on the end-user device 212, on the server 214, on another external computing device (not shown), and/or any combination thereof.

Each of a computing device associated with the scenario solution authoring engine 210, the end-user device 212, and the server 214, may be any type of computing device, such as, for example, computing device 100 described above with reference to FIG. 1. By way of example only and not limitation, each of a computing device associated with the scenario solution authoring engine 210, the end-user device 212, and/or the server 214 may be a personal computer, desktop computer, laptop computer, handheld device, mobile handset, consumer electronic device, or the like. It should be noted, however, that the present invention is not limited to implementation on such computing devices, but may be implemented on any of a variety of different types of computing devices within the scope of embodiments hereof.

As previously stated, computing system 200 is configured for organizing scenario solution-related information and controlling access thereto. Scenario solution-related information generally includes information related to a particular problem that a user initiating a query to a search engine desires to solve. That is, scenario solution-related information includes information that is designed to lead a user through a series of steps implemented by a workflow, or an executable "scenario solution" as it is referred to herein, to achieve a particular result.

A scenario solution is typically authored, for instance, utilizing scenario solution authoring engine 210, by an individual that is an expert in his or her field, an individual that has a particular interest in a field associated with the scenario solution, and/or an individual that has been confronted with the issue that the scenario solution purports to address. Scenario solutions are comprised of two scenario entities: a solution and a scenario description. A "solution," as the term is utilized herein, is essentially a series of steps implemented by a workflow. Often times, scenario solutions are comprised of sub-scenario solutions whose sequential execution (e.g., organized via a requires relation) results in successful completion of the scenario solution end-to-end. Thus, a scenario solution may include any number of scenario sub-solutions associated with one another such that they may be executed in a particular order.

It should be noted that scenario solutions may either be authored from scratch or existing scenario solutions may be located and reused (whether modified or unmodified). Further, authoring a scenario solution may be as simple as recording and replaying a search session or it may be more complex, for instance, by executing search queries in the context of a C++ or JavaScript program. Any and all such variations are contemplated to be within the scope of embodiments hereof.

Often, successful completion of a scenario solution requires one or more peripheral objects or enablers. An "enabler," as the term is utilized herein, may include, for instance, a document, a software/hardware object, and/or a person or organization that freely (or for financial gain) implements a scenario solution. It will be understood and appreciated by those of ordinary skill in the art that the listed enablers are provided by way of example only and that embodiments of the present invention are not so limited. Any object that implements a scenario solution or sub-scenario solution may be considered an enabler within embodiments hereof.

Users often have access to some of the enablers needed to execute a particular scenario solution but not to others. Determining to which enablers s/he has access, to which enablers s/he does not have access to, and how to acquire any enablers s/he does not have access to can often be a rate-limiting factor when it comes to executing scenario solutions. Accordingly, in embodiments, a scenario solution author will create scenario queries designed to retrieve any enabler required for successful execution of an authored scenario solution.

In addition to one or more solutions, scenario solutions include a scenario description. A "scenario description," as the term is utilized herein, is a webpage that describes an executable scenario solution. Scenario descriptions may be generated by any number of methods including, without limitation, receipt of a description from the scenario solution author, extraction of one or more keywords from the corresponding scenario solution, or the like. It will be understood and appreciated by those of ordinary skill in the art that embodiments of the present invention are not intended to be limited to any particular system or method for generating scenario descriptions. Any number of known description-generating methods may be utilized in accordance with embodiments hereof. Scenario descriptions are typically located by keyword search (the keywords being derived from a scenario-related query) and selectable identifiers thereof are presented in response to a search request, as more fully described below.

Once a scenario solution author completes the authoring of an executable scenario solution, the scenario solution may be published into one or more namespaces and/or associated with one or more keyword spaces such that it may be searched upon receipt of a scenario-related query, as more fully described below. "Namespaces," as utilized herein, are used to segment knowledge into verticals and to provide an extensibility point for customized and scenario solution-specific search terms. For instance, the "My Media/My Music" namespace may contain scenario solutions that are music scenario solutions, whereas the "My Life/My Store" namespace may contain information about stores at which a user commonly shops. A namespace provides a metadata specification relevant to a scenario solution by providing keywords specific to the namespace (similar to search macros). The root namespace defines basic keywords and relations used by the search engine. Namespaces provide a vocabulary for restricting search by defining a schema. For example, the word "format" means something different in the "My Media" namespace than it does in the "Storage" namespace. That is, a namespace defines keywords that can be used in search queries when targeted against that namespace.

When an author publishes a scenario, s/he specifies a tag (e.g., a meta-tag) that describes the namespace(s)/keyword space(s) in association with which s/he wants to publish the scenario solution. The author is incentivized to apply the appropriate namespace tag(s) to a published scenario solution so that the search engine may locate it more easily. Systems and methods for publishing information in a network environment so that it may be accessible by other users are known in the art and, accordingly, are not further described herein. Embodiments of the present invention are not limited to any particular publication system/method.

A real or virtual execution environment within which one or more enablers provided by a scenario solution executes is referred to herein as a "scenario solution execution workspace" or "workspace." Thus, stored in association with a workspace is metadata associated with such enablers. Also stored in association with a workspace are namespace/keyword space instances. That is, when a user executes a scenario solution, one or more local instances of the namespace(s)/keyword space(s) with which the scenario solution is associated may be created and populated with data, e.g., metadata related to enablers acquired by the user in the context of the executable scenario solution, information related to other scenario solutions stored in association with the namespace/keyword space, and the like. Accordingly, a workspace associated with a particular user may define a locality associated with the user.

The end-user device 210 may include a local information store (not shown) configured to store information related to one or more scenario solutions of interest to the user and one or more enablers previously acquired by the user, as more fully described herein below. By way of example only, and not limitation, information stored in association with the local information store may include at least one previously executed scenario solution instance, metadata that corresponds to at least one enabler acquired during execution of at least one previously executed scenario solution instance, metadata that corresponds to at least one previously acquired enabler, and any user groups to which the user associated with end-user device 210 is associated. The information stored in association with the local information store may be segregated into a plurality of workspaces, each workspace being associated with the namespace/keyword space instances, enabler metadata, and the like relevant thereto. Thus, the local information store is itself a workspace with a plurality of more specific workspaces associated therewith. A user's local information store may also define a locality associated with the user.

As shown in FIG. 2, the server 214 includes a receiving module 220, a determining module 222, an analyzing module 224, a namespace creation module 226, a workspace creation module 228, and associating module 230, and an access controlling module 232. In some embodiments, one or more of the illustrated modules may be implemented as stand-alone applications. In other embodiments, one or more of the illustrated modules may be integrated directly into the operating system of the server 214, a computing device associated with the scenario authoring engine 210, the end-user device 212, another external computing device (not shown), or any combination thereof. It will be understood by those of ordinary skill in the art that the illustrative modules are exemplary in nature and in number and should not be construed as limiting. Any number of modules may be employed to achieve the desired functionality within the scope of embodiments of the present invention.

The receiving module 220 is configured for receiving one or more executable scenario solution created by, e.g., a scenario solution author utilizing scenario solution authoring engine 210, as more fully described herein below. The receiving module 220 is further configured for receiving one or more scenario-related queries, for instance, from end-user device 212. In embodiments, once received, the receiving module 220 may transmit the received scenario solution-related information for storage, for instance, in association with database 216.

The determining module 222 is configured for determining at least one of a namespace/keyword space and a workspace with which each of the received executable scenario solutions is to be associated and associating module 230 is configured for associating each received executable scenario solution with the determined namespace(s)/keyword space(s) and/or workspace(s). That is, the determining module 222 may determine that a scenario solution received from scenario solution authoring engine 210 is to be associated (utilizing associating module 230) with one or more namespaces/keyword spaces and that a scenario solution to be returned in response to a scenario-related search query is to be associated (utilizing associating module 230) with one or more user-specific workspaces and/or one or more local instances of a namespace/keyword space. In embodiments, a scenario solution author defines the namespace(s)/keyword space(s) into which a scenario solution is to be published and a user initiating a scenario-related query defines the workspace(s) with which the query and any corresponding scenario solution-related information is to be associated.

Namespace creation module 226 is configured for creating one or more namespaces and/or one or more keyword spaces. As previously stated, namespaces and keyword spaces are used to segment knowledge into verticals and to provide an extensibility point for customized and scenario solution-specific search terms. If upon authoring a scenario solution, the author is able to identify an existing namespace and/or keyword space into which to publish his/her scenario, namespace creation module 226 may not be utilized. However, if the author desires to create a newly-defined namespace and/or keyword space, the parameters relating to the namespace/keyword space may be received and the desired namespace/keyword space created utilizing namespace creation module 226. Further, namespace creation module 226 is configured for creating one or more local instances of a namespace or keyword space upon user selection of an executable scenario solution, as more fully described below.

Figure 3:
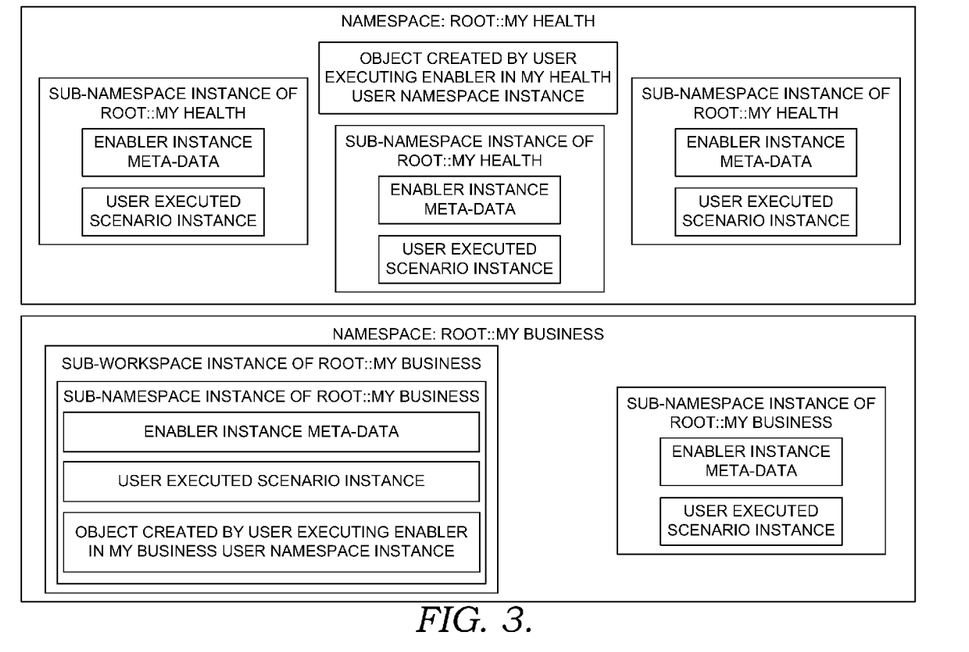
FIG. 3 is a schematic diagram illustrating organization of scenario solution-related information into a plurality of namespaces/keyword spaces and workspaces, in accordance with an embodiment of the present invention.

Workspace creation module 228 is configured for creating one or more workspaces. As previously stated, workspaces (or scenario solution execution workspaces) are real or virtual environments within which one or more enablers provided by a scenario solution executes. Turning to FIG. 3, a schematic diagram is shown illustrating organization of scenario solution-related information into a plurality of workspaces (and namespaces/keyword spaces), in accordance with an embodiment of the present invention. The entirety of FIG. 3 represents a user's local information store. Within the local information store are two workspaces, each workspace being associated with a local namespace. That is, the user's local information store includes a "My Health" workspace and a "My Business" workspace. Within each of the workspaces, metadata related to one or more enablers acquired during execution of a scenario solution related thereto and an instance of the corresponding user-executed scenario solution is stored. Additionally, an enabler executed in association with the "My Health" workspace (rather than a sub-workspace thereof) is shown.

Organization of scenario solution-related information into workspaces as shown has a number of benefits. First, a scenario-related search query may be restricted by one or more parameters corresponding to a particular workspace, sub-workspace, or the like. Thus, the resources necessary to conduct a search are restricted. Additionally, segregation of information in this manner permits a user to define authorized access differently with respect to different workspaces, as more fully described below. Thus, a user's privacy is not compromised upon the sharing of information.

Referring back to FIG. 2, analyzing module 224 is configured for analyzing metadata and scenario solutions associated with a namespace/keyword space and/or workspace determined to be relevant to a scenario-related query while not analyzing metadata and scenario solutions not associated with the relevant namespace/keyword space and/or workspace. Such segregated analysis more efficiently utilizes resources in comparison to a search engine searching all information in response to each initiated query.

The access controlling module 232 is configured for allowing or restricting access to at least one of the namespace/keyword space and the workspace to security principals such as users, machines, or software. For instance, referring back to FIG. 3, a user may desire for his/her business associates or members of a business-related user group to have access to all information stored in association with the "My Business" workspace but would like the same authorized persons to be unable to access information associated with the "My Health" workspace. The access controlling module 232 is configured to control access at a scenario solution entity, a scenario solution enabler, a workspace, a local namespace instance, a local keyword instance, or any combination thereof.

Figure 4:
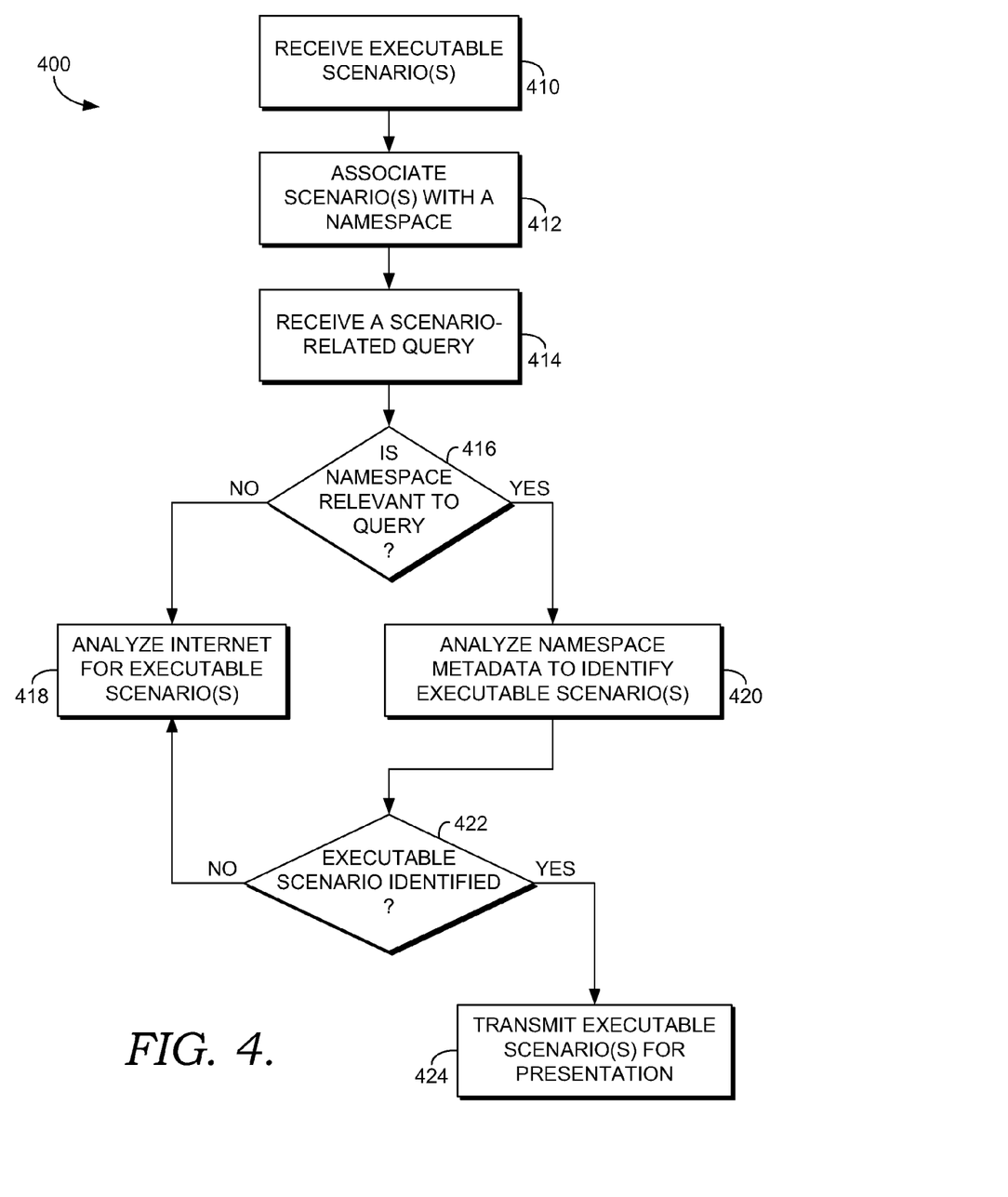
FIG. 4 is a flow diagram showing a method for organizing scenario solution-related information, and using such organization to restrict search parameters, in accordance with an embodiment of the present invention.

With reference to FIG. 4, a flow diagram is shown illustrating a method 400, for organizing scenario solution-related information, in accordance with an embodiment of the present invention. Initially, as indicated at block 410, one or more executable scenario solutions are received, for instance, from scenario solution authoring engine 210 of FIG. 2. Subsequently, as indicated at block 412, each received executable scenario solution is associated with at least one namespace and/or at least one keyword space, for instance, utilizing associating module 230 of FIG. 2.

Subsequently, as indicated at block 414, a scenario-related query is received, e.g., from end-user device 212. Subsequently, as indicated at block 416, it is determined if at least one namespace and/or keyword space is relevant to the received scenario-related query. If no namespace/keyword space is relevant to the scenario-related query, the Internet will subsequently be analyzed for executable scenario solutions relevant to the scenario-related query. This is indicated at block 418. However, if it is determined at block 416 that at least one namespace and/or keyword space relevant to the scenario-related query exists, metadata associated with the namespace/keyword space is analyzed to identify at least one executable scenario solution associated therewith that is relevant to the scenario-related query. This is indicated at block 420.

After the namespace/keyword space metadata is analyzed, it is determined whether at least one executable scenario solution relevant to the scenario-related query has been identified, as indicated at block 422. If it is determined at block 422 that no executable scenario solutions having metadata stored in association with the analyzed namespace(s)/keyword space(s) has been identified, the Internet will be analyzed for executable scenario solutions, as indicated at block 418. However, if it is determined at block 422 that at least one executable scenario solution having metadata associated with the namespace/keyword space has been identified as relevant to the scenario-related query, such identified executable scenario solutions are transmitted, for instance, utilizing network 218, for presentation. This is indicated at block 424. Such presentation will typically be, for instance, on a display device associated with the end-user device 212.

Figure 5:
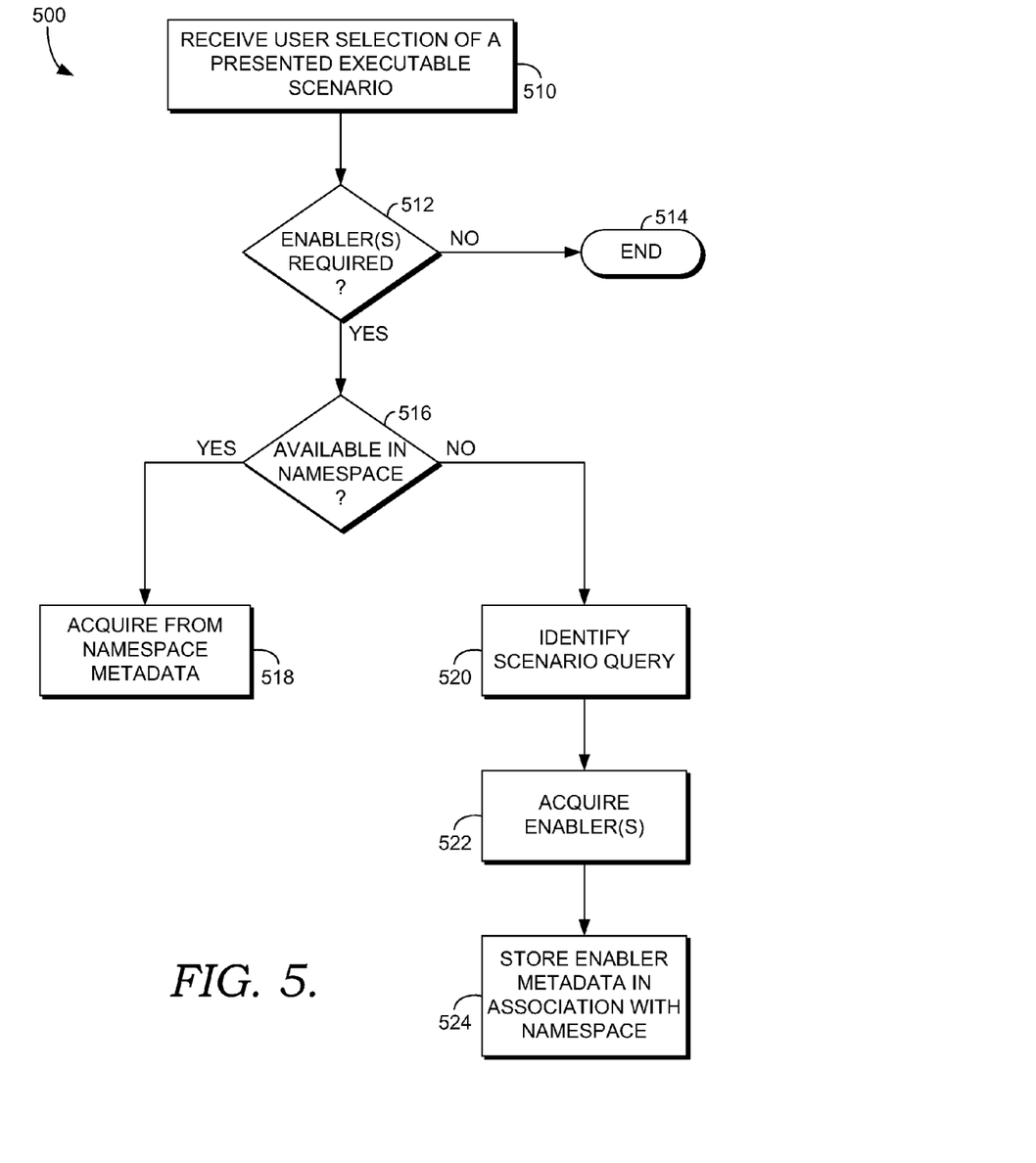
FIG. 5 is a flow diagram showing a method for organizing scenario solution-related information and using such organization to aid a user in acquiring one or more enablers necessary to execute a scenario solution, in accordance with an embodiment of the present invention.

Turning now to FIG. 5, a flow diagram is shown illustrating a method 500 for organizing scenario solution-related information and utilizing such organization to restrict search parameters, in accordance with an embodiment of the present invention. Initially, as indicated as block 510, user selection of a presented executable scenario solution is received. Subsequently, as indicated at block 512, it is determined whether one or more enablers are required to complete execution of the selected scenario solution. If it is determined that no enablers are required for completion of execution of the selected scenario solution, the method ends as indicated at block 514.

However, if it is determined at block 512 that one or more enablers is required to complete execution of the selected scenario solution, metadata associated with all namespaces/keyword spaces with which the executable scenario solution is associated are analyzed to determine if metadata related to the required enabler is available therein. This is indicated at block 516. If it is determined that metadata related to all required enablers is available in association with the namespace/keyword space, such enablers are acquired from the namespace/keyword space metadata, as indicated at block 518. If, however, it is determined at block 516 that one or more of the required enablers does not have metadata associated therewith stored in association with a namespace/keyword space with which it corresponds, a scenario query associated with the scenario solution is identified as indicated at block 520. Subsequently, the scenario query is executed and the required enabler is acquired, as indicated at block 522. Next, metadata related to the acquired enabler is stored in association with all namespace(s)/keyword space(s) corresponding to the selected scenario solution. This is indicated at block 524.

Figure 6:
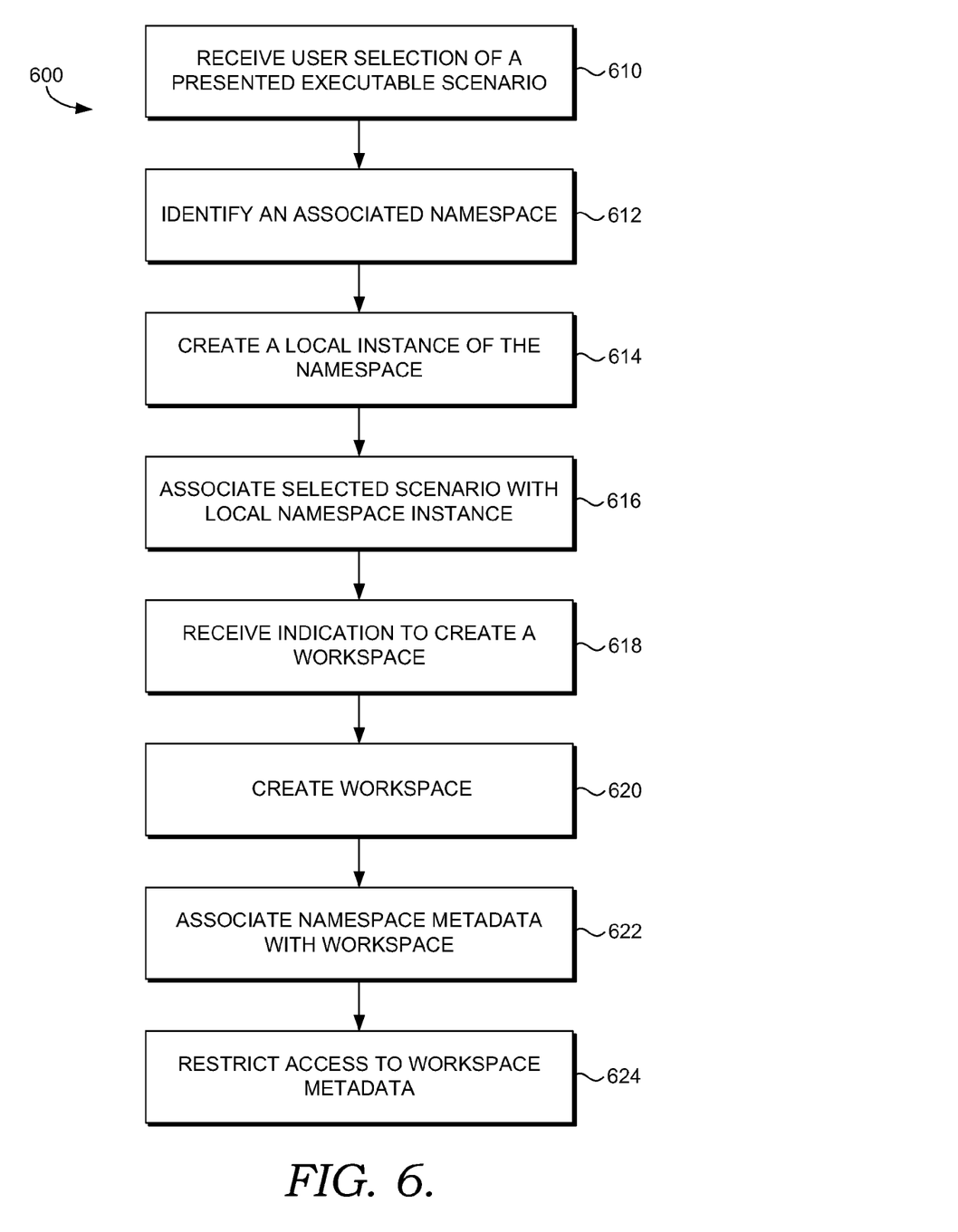
FIG. 6 is a flow diagram showing a method for organizing scenario solution-related information and controlling access to such information, in accordance with an embodiment of the present invention.

Turning now to FIG. 6, a flow diagram is shown illustrating a method 600 for organizing scenario solution-related information and for controlling access thereto, in accordance with an embodiment of the present invention. Initially, as indicated at block 610, a user selection of a presented executable scenario solution is received. Subsequently, as indicated at block 612, at least one namespace/keyword space associated with the selected scenario solution is identified. Next, as indicated at block 614, a local instance of the identified namespace/keyword space is created. Subsequently, as indicated at block 616, the selected scenario solution is associated with the local namespace/keyword space instance.

Subsequently, an indication is received from the user as to whether or not s/he desires to create a workspace. This is indicated at block 618. If the user desires to create a workspace, a workspace is subsequently created, as indicated at block 620. Once the workspace has been created, metadata associated with the namespace/keyword space is associated with the workspace, as indicated at block 622. Subsequently, it is determined whether the user desires to control access to one or more of the namespace/keyword space and the workspace to authorized principals. If it is determined that the user does wish to control access, such access is allowed and/or restricted in accordance with user-defined parameters, as indicated block 624.

As can be understood, embodiments of the present invention provide methods, systems and computer-readable media for organizing scenario solution-related information based upon a user's locality. "Locality," as the term is utilized herein, refers to a collection of metadata created based upon scenario solutions executed by a user and/or enablers acquired by a user during scenario solution execution. Such metadata may be stored in association with a scenario solution execution workspace (that is, a real or virtual execution environment within which enablers provided by a scenario solution execute), and/or in association with a user-specific information store. Once such information is acquired, a user may desire to share the information, or a portion thereof, with one or more other users, for instance, the members of a user group. However, often times, the user would prefer that the information not be made available to the public at-large. Thus, embodiments of the present invention further relate to controlling access to user-specific information to authorized principals.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more tangible computer-readable media having computer-executable instructions embodied thereon that, when executed, perform a method for organizing scenario-related information, the method comprising:

receiving a plurality of executable scenario solutions, an executable scenario solution comprising a series of steps implemented by a workflow and a scenario description that describes the executable scenario solution;

associating each received executable scenario solution with at least one of a namespace and a keyword space;

receiving, by the same entity that received the plurality of executable scenario solutions, a scenario-related query;

determining that at least one namespace or keyword space associated with one or more received executable scenario solutions is relevant to the scenario-related query;

analyzing metadata associated with the at least one determined namespace and/or keyword space to identify one or more executable scenario solutions associated therewith that are relevant to the scenario-related query;

providing the one or more identified executable scenario solutions in response to the scenario-related query;

receiving user selection of a first scenario solution, the first scenario solution being part of the one or more provided executable scenario solutions and being associated with a first namespace or a first keyword space;

determining that one or more software object enablers are required to complete execution of the selected scenario solution;

analyzing metadata associated with the first namespace or the first keyword space to determine if the one or more required software object enablers are available;

creating an instance on a user device of the first namespace and/or first keyword space associated with the selected first scenario solution;

associating the selected first scenario solution with the created namespace and/or keyword space instance;

creating a workspace;

associating metadata related to the created namespace and/or keyword space instance with the workspace; and controlling access to the workspace metadata with respect to security principals, and wherein the security principals comprise one or more of a user, a machine, an application, and any combination thereof.

2. The one or more tangible computer-readable media of claim 1, wherein a second namespace or a second keyword space are not associated with the selected first scenario solution, and wherein metadata associated with the second namespace or the second keyword space is not analyzed.

3. The one or more tangible computer-readable media of claim 1, wherein metadata related to a plurality of local namespace and/or keyword instances is associated with the workspace, wherein the method further comprises controlling access to the metadata associated with each local namespace and/or keyword instance with respect to security principals, and wherein the security principals comprise one or more of a user, a machine, an application, and any combination thereof.

4. The one or more tangible computer-readable media of claim 1, wherein the method further comprises controlling access to the selected first scenario solution with respect to security principals, and wherein the security principals comprise one or more of a user, a machine, an application, and any combination thereof.

5. The one or more tangible computer-readable media of claim 1, wherein at least one executable scenario solution is associated with the workspace, wherein the method further comprises controlling access to the executable scenario solution with respect to security principals, and wherein the security principals comprise one or more of a user, a machine, an application, and any combination thereof.

6. The one or more tangible computer-readable media of claim 1, further comprising controlling access to the software object enabler-metadata with respect to security principals, and wherein the security principals comprise one or more of a user, a machine, an application, and any combination thereof.

7. The one or more tangible computer-readable media of claim 1, further comprising restricting access to the software object enabler-metadata with respect to security principals, and wherein the security principals comprise one or more of a user, a machine, an application, and any combination thereof.

8. The one or more tangible computer-readable media of claim 1, further comprising:
   identifying a scenario query for enabler acquisition based on the metadata analysis; and
   acquiring a software object enabler based on the identified second scenario query.

9. The one or more tangible computer-readable media of claim 1, wherein analyzing metadata associated with the first namespace or the first keyword space to determine if the one or more required software object enablers are available comprises analyzing metadata associated with a corresponding local instance of the first namespace or the first keyword space in a user local data store.

* * * * *